(12) United States Patent  
Shen et al.

(10) Patent No.: US 8,953,500 B1  
(45) Date of Patent: Feb. 10, 2015

(54) BRANCH NODE-INITIATED POINT TO MULTI-POINT LABEL SWITCHED PATH SIGNALING WITH CENTRALIZED PATH COMPUTATION

(71) Applicant: Juniper Networks, Inc., Sunnyvale, CA (US)

(72) Inventors: Yimin Shen, Shrewsbury, MA (US); Ina Minei, Sunnyvale, CA (US); Raveendra Torvi, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 133 days.

(21) Appl. No.: 13/853,966

(22) Filed: Mar. 29, 2013

(51) Int. Cl.  
*H04L 12/28* (2006.01)  
*H04L 12/761* (2013.01)  
*H04L 1/00* (2006.01)

(52) U.S. Cl.  
CPC ..................................... *H04L 45/16* (2013.01)  
USPC ........................... 370/256; 370/238; 370/390

(58) Field of Classification Search  
None  
See application file for complete search history.

(56) References Cited

U.S. PATENT DOCUMENTS

| | | | |
|---|---|---|---|
| 5,600,642 A | 2/1997 | Pauwels et al. |
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,571,218 B1 | 5/2003 | Sadler |
| 6,597,703 B1 | 7/2003 | Li et al. |
| 6,611,528 B1 | 8/2003 | Farinacci et al. |
| 6,625,773 B1 | 9/2003 | Boivie et al. |
| 6,731,652 B2 | 5/2004 | Ramfelt et al. |
| 6,778,531 B1 | 8/2004 | Kodialam et al. |
| 6,807,182 B1 | 10/2004 | Dolphin et al. |
| 6,879,594 B1 | 4/2005 | Lee et al. |

(Continued)

FOREIGN PATENT DOCUMENTS

| | | |
|---|---|---|
| JP | 2005-086222 | 3/2005 |
| JP | 2005-130258 | 5/2005 |

(Continued)

OTHER PUBLICATIONS

Satyanarayana et al., "Extensions to GMPLS RSVP Graceful Restart", draft-aruns-ccamp-restart-ext-01.txt, Jul. 2004, Network Working Group Internet Draft, 23 pgs.

(Continued)

*Primary Examiner* — Clemence Han  
(74) *Attorney, Agent, or Firm* — Shumaker & Sieffert, P.A.

(57) ABSTRACT

Techniques are described for establishing a point-to-multi-point (P2MP) label switched path (LSP) using a branch node-initiated signaling model in which branch node to leaf (B2L) sub-LSPs are signaled and utilized to form a P2MP LSP. The techniques described herein provides a scalable solution in which the number of sub-LSPs for which the source node or any given branch node need maintain state is equal to the number of physical data flows output from that node to downstream nodes, i.e., the number of output interfaces used for the P2MP LSP by that node to output data flows to downstream nodes. As such, unlike the conventional source node-initiated model in which each node maintains state for sub-LSPs that service each of the leaf nodes downstream from the device, the size and scalability of a P2MP LSP is no longer bound to the number of leaves that are downstream from that node.

20 Claims, 6 Drawing Sheets

(56) References Cited

U.S. PATENT DOCUMENTS

| | | |
|---|---|---|
| 6,920,503 B1 | 7/2005 | Nanji et al. |
| 6,968,389 B1 | 11/2005 | Menditto et al. |
| 7,035,226 B2 | 4/2006 | Enoki et al. |
| 7,039,687 B1 | 5/2006 | Jamieson et al. |
| 7,082,102 B1 | 7/2006 | Wright |
| 7,133,928 B2 | 11/2006 | McCanne |
| 7,251,218 B2 | 7/2007 | Joregensen |
| 7,269,135 B2 | 9/2007 | Frick et al. |
| 7,281,058 B1 | 10/2007 | Shepherd et al. |
| 7,296,090 B2 | 11/2007 | Jamieson et al. |
| 7,330,468 B1 | 2/2008 | Tse-Au |
| 7,333,491 B2 | 2/2008 | Chen et al. |
| 7,359,328 B1 | 4/2008 | Allan |
| 7,359,393 B1 | 4/2008 | Nalawade et al. |
| 7,360,084 B1 | 4/2008 | Hardjono |
| 7,366,894 B1 | 4/2008 | Kalimuthu et al. |
| 7,418,003 B1 | 8/2008 | Alvarez et al. |
| 7,463,591 B1 | 12/2008 | Kompella et al. |
| 7,477,642 B2 | 1/2009 | Aggarwal et al. |
| 7,483,439 B2 | 1/2009 | Shepherd et al. |
| 7,489,695 B1 | 2/2009 | Ayyangar |
| 7,519,010 B1 | 4/2009 | Aggarwal et al. |
| 7,522,599 B1 | 4/2009 | Aggarwal et al. |
| 7,522,600 B1 | 4/2009 | Aggarwal et al. |
| 7,532,624 B2 | 5/2009 | Ikegami et al. |
| 7,545,735 B1 | 6/2009 | Shabtay et al. |
| 7,558,219 B1 | 7/2009 | Aggarwal et al. |
| 7,558,263 B1 | 7/2009 | Aggarwal et al. |
| 7,564,803 B1 | 7/2009 | Minei et al. |
| 7,564,806 B1 | 7/2009 | Aggarwal et al. |
| 7,570,604 B1 | 8/2009 | Aggarwal et al. |
| 7,570,605 B1 | 8/2009 | Aggarwal et al. |
| 7,570,638 B2 | 8/2009 | Shimizu et al. |
| 7,590,115 B1 | 9/2009 | Aggarwal et al. |
| 7,593,405 B2 | 9/2009 | Shirazipour et al. |
| 7,602,702 B1 | 10/2009 | Aggarwal |
| 7,633,859 B2 | 12/2009 | Filsfils et al. |
| 7,742,482 B1 | 6/2010 | Aggarwal |
| 7,768,925 B2 | 8/2010 | He et al. |
| 7,787,380 B1 | 8/2010 | Aggarwal et al. |
| 7,797,382 B2 | 9/2010 | Bou-Diab |
| 7,804,790 B1 | 9/2010 | Aggarwal et al. |
| 7,830,787 B1 | 11/2010 | Wijnands et al. |
| 7,839,862 B1 | 11/2010 | Aggarwal |
| 7,856,509 B1 | 12/2010 | Kodeboyina |
| 7,860,104 B1 | 12/2010 | Aggarwal |
| 7,925,778 B1 | 4/2011 | Wijnands et al. |
| 7,933,267 B1 | 4/2011 | Aggarwal et al. |
| 7,940,698 B1 | 5/2011 | Minei et al. |
| 7,957,386 B1 | 6/2011 | Aggarwal et al. |
| 7,983,261 B1 | 7/2011 | Aggarwal et al. |
| 7,990,963 B1 | 8/2011 | Aggarwal et al. |
| 7,990,965 B1 | 8/2011 | Aggarwal et al. |
| 7,990,993 B1 | 8/2011 | Ghosh et al. |
| 8,068,492 B1 | 11/2011 | Aggarwal et al. |
| 8,111,633 B1 | 2/2012 | Aggarwal et al. |
| 8,121,056 B1 | 2/2012 | Aggarwal et al. |
| 8,160,076 B1 | 4/2012 | Aggarwal et al. |
| 2002/0071390 A1 | 6/2002 | Reeves et al. |
| 2002/0109879 A1 | 8/2002 | Wing So |
| 2002/0118644 A1 | 8/2002 | Moir |
| 2002/0181477 A1 | 12/2002 | Mo et al. |
| 2002/0186664 A1 | 12/2002 | Gibson et al. |
| 2002/0191584 A1 | 12/2002 | Korus et al. |
| 2003/0012215 A1 | 1/2003 | Novaes |
| 2003/0016672 A1 | 1/2003 | Rosen et al. |
| 2003/0021282 A1 | 1/2003 | Hospodor |
| 2003/0031175 A1 | 2/2003 | Hayashi et al. |
| 2003/0043772 A1 | 3/2003 | Mathis et al. |
| 2003/0056007 A1 | 3/2003 | Katsube et al. |
| 2003/0063591 A1 | 4/2003 | Leung et al. |
| 2003/0087653 A1 | 5/2003 | Leung et al. |
| 2003/0088696 A1 | 5/2003 | McCanne |
| 2003/0099235 A1 | 5/2003 | Shin et al. |
| 2003/0108047 A1 | 6/2003 | Mackiewich et al. |
| 2003/0112748 A1 | 6/2003 | Puppa et al. |
| 2003/0123446 A1 | 7/2003 | Muirhead et al. |
| 2003/0172114 A1 | 9/2003 | Leung |
| 2003/0177221 A1 | 9/2003 | Ould-Brahim et al. |
| 2003/0191937 A1 | 10/2003 | Balissat et al. |
| 2003/0210705 A1 | 11/2003 | Seddigh et al. |
| 2004/0032856 A1 | 2/2004 | Sandstrom |
| 2004/0034702 A1 | 2/2004 | He |
| 2004/0037279 A1 | 2/2004 | Zelig et al. |
| 2004/0042406 A1 | 3/2004 | Wu et al. |
| 2004/0047342 A1 | 3/2004 | Gavish et al. |
| 2004/0081154 A1 | 4/2004 | Kouvelas |
| 2004/0151180 A1 | 8/2004 | Hu et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0213160 A1 | 10/2004 | Regan et al. |
| 2004/0218536 A1 | 11/2004 | Yasukawa et al. |
| 2004/0240445 A1 | 12/2004 | Shin et al. |
| 2004/0240446 A1 | 12/2004 | Compton |
| 2005/0001720 A1 | 1/2005 | Mason et al. |
| 2005/0013295 A1 | 1/2005 | Regan et al. |
| 2005/0018693 A1 | 1/2005 | Dull |
| 2005/0025156 A1 | 2/2005 | Smathers |
| 2005/0027782 A1 | 2/2005 | Jalan et al. |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0129001 A1 | 6/2005 | Backman et al. |
| 2005/0169270 A1 | 8/2005 | Mutou et al. |
| 2005/0220132 A1 | 10/2005 | Oman et al. |
| 2005/0232193 A1 | 10/2005 | Jorgensen |
| 2005/0262232 A1 | 11/2005 | Cuervo et al. |
| 2005/0265308 A1 | 12/2005 | Barbir et al. |
| 2005/0271035 A1 | 12/2005 | Cohen et al. |
| 2005/0271036 A1 | 12/2005 | Cohen et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0088031 A1 | 4/2006 | Nalawade |
| 2006/0126496 A1 | 6/2006 | Filsfils et al. |
| 2006/0147204 A1 | 7/2006 | Yasukawa et al. |
| 2006/0153067 A1 | 7/2006 | Vasseur et al. |
| 2006/0164975 A1 | 7/2006 | Filsfils et al. |
| 2006/0182034 A1 | 8/2006 | Klinker et al. |
| 2006/0221958 A1 | 10/2006 | Wijnands et al. |
| 2006/0262735 A1 | 11/2006 | Guichard et al. |
| 2006/0262786 A1 | 11/2006 | Shimizu et al. |
| 2007/0025276 A1 | 2/2007 | Zwiebel et al. |
| 2007/0025277 A1 | 2/2007 | Sajassi et al. |
| 2007/0036162 A1 | 2/2007 | Tingle et al. |
| 2007/0076709 A1 | 4/2007 | Mattson et al. |
| 2007/0091891 A1 | 4/2007 | Zwiebel et al. |
| 2007/0098003 A1 | 5/2007 | Boers et al. |
| 2007/0104119 A1 | 5/2007 | Sarkar et al. |
| 2007/0124454 A1 | 5/2007 | Watkinson |
| 2007/0129291 A1 | 6/2007 | Tian |
| 2007/0140107 A1 | 6/2007 | Eckert et al. |
| 2007/0177593 A1 | 8/2007 | Kompella |
| 2007/0177594 A1 | 8/2007 | Kompella |
| 2007/0189177 A1 | 8/2007 | Zhai |
| 2008/0056258 A1 | 3/2008 | Sharma et al. |
| 2008/0112330 A1 | 5/2008 | He et al. |
| 2008/0123524 A1 | 5/2008 | Vasseur et al. |
| 2008/0123654 A1 | 5/2008 | Tse-Au |
| 2008/0291921 A1 | 11/2008 | Du et al. |
| 2009/0028149 A1 | 1/2009 | Yasukawa et al. |
| 2009/0175274 A1 | 7/2009 | Aggarwal et al. |
| 2009/0225650 A1 | 9/2009 | Vasseur et al. |
| 2009/0268731 A1* | 10/2009 | Narayanan et al. ............ 370/390 |
| 2010/0111086 A1* | 5/2010 | Tremblay et al. ............ 370/390 |
| 2010/0208733 A1* | 8/2010 | Zhao et al. .................... 370/390 |
| 2012/0044936 A1* | 2/2012 | Bellagamba et al. ......... 370/392 |
| 2012/0057505 A1* | 3/2012 | Xue .............................. 370/255 |
| 2013/0016605 A1* | 1/2013 | Chen ............................ 370/221 |

(56) References Cited

U.S. PATENT DOCUMENTS

| | | | | |
|---|---|---|---|---|
| 2014/0003229 | A1* | 1/2014 | Gandhi et al. | 370/225 |
| 2014/0029418 | A1* | 1/2014 | Jain et al. | 370/228 |

FOREIGN PATENT DOCUMENTS

| | | |
|---|---|---|
| JP | 2005-167482 | 6/2005 |
| JP | 2005-252385 | 9/2005 |
| JP | 2005-323266 | 11/2005 |
| KR | 2004/001206 A | 1/2004 |
| WO | 02/091670 A2 | 11/2002 |
| WO | 2004/071032 A1 | 8/2004 |

OTHER PUBLICATIONS

Aggarwal et al., "MPLS Upstream Label Assignment and Context Specific Label Space," Network Working Group Internet Draft, Jan. 2005, draft-raggarwa-mpls-upstream-label-00.txt, 9 pgs.

Wijnands et al., "Multicast Extensions for LDP," Network Working Group Internet Draft, Mar. 2005, draft-wijnands-mpls-ldp-mcast-ext-00.txt, 13 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

Zhang et al., "A Destination-initiated Multicast Routing Protocol for Shortest Path Tree Constructions," GLOBECOM 2003, IEEE Global Telecommunications Conference, XP010677629, pp. 2840-2844.

Yasukawa et al., Requirements for point to multipoint extension to RSVP-TE, Oct. 2003.

Wei et al., "Establishing point to multipoint MPLS TE LSPs," Aug. 2004.

Aggarwal et al., "Establishing Point to Multipoint MPLS TE LSPs," submitted to Internet Engineering Task Force (IETF) Feb. 11, 2007, pp. 1-15.

Rekhter et al., "A Border Gateway Protocol 4 (BGP-4)," Mar. 1995, 93 pp.

Atlas et al., "MPLS RSVP-TE Interoperability for Local Protection/Fast Reroute," IETF, Jul. 2001, pp. 1-14.

Rosen et al., "Multicast in MPLS/BGP IP VPNs," draft-rosen-vpn-mcast-07.txt, May 2004, 27 pgs.

Deering et al., "Protocol Independent Multicast-Sparse Mode (PIM-SM): Motivation and Architecture," draft-ietf-idmr-pim-arch-05.txt, Aug. 4, 1998, 30 pgs.

Kompella et al., "Virtual Private LAN Service," draft-ietf-l2vpn-vpls-bgp-00.txt, May 2003, 22 pgs.

Martini et al., "Transport of Layer 2 Frames Over MPLS," Network Working Group Internet Draft, draft-martini-l2circuit-trans-mpls-08.txt, Nov. 2001, 18 pgs.

Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Decraene et al., "LDP Extension for Inter-Area Label Switched Paths (LSPs)," Network Working Group RFC 5283, Jul. 2008, 13 pp.

Decraene et al., "LDP extension for Inter-Area LSP", Network Working Group, draft-ietf-mpls-ldp-interarea-03.txt, Feb. 2008, 12 pp.

Decraene et al., "LDP extensions for Inter-Area LSP", Network Working Group, draft-decraene-mpls-ldp-interarea-02.txt, Jun. 2006, 8 pp.

Kompella, "Layer 2 VPNs Over Tunnels," Network Working Group, Jan. 2006, 27 pp.

Rekhter et al., "Carrying Label Information in BGP-4", Network Working Group, RFC 3107, May 2001, 9 pp.

Andersson et al., "LDP Specification", Network Working Group, RFC 3036, Jan. 2001, (118 pages).

Swallow et al., "Network Scaling with Aggregated IP LSPs", Network Working Group, draft-swallow-mpls-aggregated-fec-00.txt, Jul. 2007, 10 pp.

Shah et al., "Extensions to MPLS-based Layer 2 VPNs," Network Working Group, Sep. 2001, 14 pp.

U.S. Appl. No. 12/574,428, by Rahul Aggarwal, filed Oct. 6, 2009.
U.S. Appl. No. 12/871,784, by Rahul Aggarwal, filed Aug. 30, 2010.
U.S. Appl. No. 13/448,085, by Rahul Aggarwal, filed Apr. 16, 2012.
U.S. Appl. No. 12/951,885, by Rahul Aggarwal, filed Nov. 22, 2010.

Aggarwal et al. "Extensions to Resource Reservation Protocol—Traffic Engineering (RSVP-TE) for Point-to-Multipoint TE Label Switched Paths (LSPs)" Network Working Group, RFC 4875, May 2007, 54 pgs.

Atlas et al. "Interface to the Routing System Framework," Network Working Group, Internet-draft, Jul. 30, 21012, 22 pgs.

Vasseur et al. "Path Computation Element (PCE) Communication Protocol (PCEP)," Network Working Group, Request for Comment 5440, Mar. 2009, 88 pgs.

U.S. Appl. No. 13/110,987, filed May 19, 2011 and entitled "Dynamically Generating Application-Layer Traffic Optimization Protocol Maps."

U.S. Appl. No. 13/324,861, "Path Computation Element Communication Protocol (PCEP) Extensions for Stateful Label Switched Path Management," filed Dec. 13, 2011.

\* cited by examiner

BRANCH NODE-INITIATED POINT TO MULTI-POINT LABEL SWITCHED PATH SIGNALING WITH CENTRALIZED PATH COMPUTATION

TECHNICAL FIELD

The invention relates to computer networks and, more particularly, to engineering traffic flows within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

Multi-Protocol Label Switching (MPLS) is a suite of protocols used to engineer traffic patterns within Internet Protocol (IP) networks. By utilizing MPLS, a source device can request a path through a network to a destination device, i.e., a Label Switched Path (LSP). An LSP defines a distinct path through the network to carry MPLS packets from the source device to a destination device. Each router along a LSP allocates a label and propagates the label to the closest upstream router along the path. Routers along the path cooperatively perform MPLS operations to forward the MPLS packets along the established path. A variety of protocols exist for establishing LSPs. For example, the Label Distribution Protocol (LDP), and the Resource Reservation Protocol with Traffic Engineering extensions (RSVP-TE).

Some implementations make use of Point to Multi-Point (P2MP) LSP in which a path is established through a network from a source device to multiple destination devices. P2MP LSPs are commonly used, for example, to distribute multicast data or to implement virtual private networks (VPNs). In the case of a P2MP LSP, one or more of the routers along the path may comprise branch routers located at points where the path divides. In addition to performing MPLS operations to forward the MPLS multicast packets along the path, the branch routers perform replication of the packets such that each branch of the P2MP LSP continues to carry copies of the multicast packets.

In generally, P2MP LSP construction follows a source-initiated signaling model in which the source device executes a label distribution protocol, such as RSVP-TE, to signal a different point-to-point LSP for each destination device (leaf node). The P2P LSPs, referred to as source-to-leaf (S2L) sub-LSPs, provide a label switch paths from the source device to a different, corresponding destination device. For example, the source device may signal the P2P sub-LSPs and combine the sub-LSPs to form the P2MP LSP. Techniques for forming a P2MP LSP using source-to-leaf sub-LSPs are described in RFC 4875, "Extensions to Resource Reservation Protocol—Traffic Engineering (RSVP-TE) for Point-to-Multipoint TE Label Switched Paths (LSPs)," IETF, May 2007, the entire contents of which are incorporated herein by reference.

SUMMARY

In general, techniques are described for establishing a point-to-multipoint (P2MP) label switched path (LSP) using a branch node-initiated signaling model in which branch node to leaf (B2L) sub-LSPs are signaled and utilized to form a P2MP LSP. For example, a P2MP LSP may be formed in which each B2L sub-LSPs at each level is said to be 'attached' to a sub-LSP at a higher-level branch node or the source node. In general, a branch node to leaf (B2L) sub-LSP refers to a P2P LSP that is signaled from a branch node to a leaf node.

In one example, a centralized path computation element (PCE) may compute explicit route objects (EROS) for the S2L and B2L sub-LSPs, and send the EROs to the source node and branch nodes respectively via a Path Computation Element (PCE) Communication Protocol (PCEP). The source node and branch nodes in turn signal the S2L sub-LSPs and B2L sub-LSPs separately. After the sub-LSPs are set up, the source node may merge all S2L sub-LSPs by building a flood next-hop; Each branch node attach lower level sub-LSPs (locally initiated) to the associated higher level sub-LSPs, by adding a branch next-hop to the flood next-hop of that higher level sub-LSP.

In one example, a method comprises receiving, with a controller, a request for a point-to-multipoint (P2MP) label switched path (LSP) from a source node through one or more branch nodes to a plurality of leaf nodes within a network. The method comprises determining, with the controller, a hierarchy of point-to-point (P2P) LSPs, wherein a first level of the hierarchy includes at least one source-to-leaf (S2L) P2P LSP from the source node as an ingress for the S2L P2P LSP through one or more of the branch nodes to a first one of the leaf nodes as an egress for the S2L P2P LSP, and wherein each remaining level of the hierarchy includes at least one branch-to-leaf (B2L) P2P LSP from one of the branch nodes as in ingress to the B2L P2P LSP to a different one of the leaf nodes as an egress for the B2L P2P LSP. The method further comprises outputting messages, with the controller, to direct the source node, the one or more transit nodes and the plurality of leaf nodes to signal the hierarchy of P2P LSPs to form the P2MP LSP.

In another example, a device comprises a network interface to receive a request for a point-to-multipoint (P2MP) label switched path (LSP) from a source node through one or more branch nodes to a plurality of leaf nodes within a network. The device includes a path computation module executing on one or more processors. The path computation module determines a hierarchy of point-to-point (P2P) sub-LSPs. A first level of the hierarchy includes at least one P2P source-to-leaf (S2L) sub-LSP from the source node as an ingress for the P2P S2L sub-LSP through one or more of the branch nodes to a first one of the leaf nodes as an egress for the P2P S2L LSP. Each remaining level of the hierarchy of P2P sub-LSPs includes at least one P2P branch-to-leaf (B2L) sub-LSP from one of the branch nodes as in ingress to the P2P B2L sub-LSP to a different one of the leaf nodes as an egress for the P2P B2L sub-LSP. A path provisioning module of the device outputs messages to direct the source node, the one or more branch nodes and the plurality of leaf nodes to signal the hierarchy of P2P sub-LSPs to form the P2MP LSP.

A computer-readable storage medium comprising instructions that cause a network device to receive a request for a point-to-multipoint (P2MP) label switched path (LSP) from a source node through one or more branch nodes to a plurality of leaf nodes within a network. The instructions cause the device to determine a hierarchy of point-to-point (P2P) sub-LSPs. A first level of the hierarchy includes at least one P2P source-to-leaf (S2L) sub-LSP from the source node as an ingress for the P2P S2L sub-LSP through one or more of the branch nodes to a first one of the leaf nodes as an egress for the P2P S2L LSP. Each remaining level of the hierarchy includes at least one P2P branch-to-leaf (B2L) sub-LSP from one of the branch nodes as in ingress to the P2P B2L sub-LSP to a different one of the leaf nodes as an egress for the P2P B2L sub-LSP. The instructions cause the device to output messages, with the controller, to direct the source node, the one or more branch nodes and the plurality of leaf nodes to signal the hierarchy of P2P sub-LSPs to form the P2MP LSP.

The techniques may provide certain advantages. For example, the techniques described herein provides a scalable solution in which the number of sub-LSPs for which the source node or any given branch node need maintain state is equal to the number of physical data flows output from that node to downstream nodes, i.e., the number of output interfaces used for the P2MP LSP by that node to output data flows to downstream nodes. As such, unlike the conventional source node-initiated model in which each node maintains state for sub-LSPs that service each of the leaf nodes downstream from the device, the size and scalability of a P2MP LSP is no longer bound to the number of leaves that are downstream from that node. Hence, the signaling efficiency and scalability of the techniques described herein may be significantly higher than the source node-initiated signaling model. Further, the chance of any remerge condition and cross-over may be significantly reduced.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
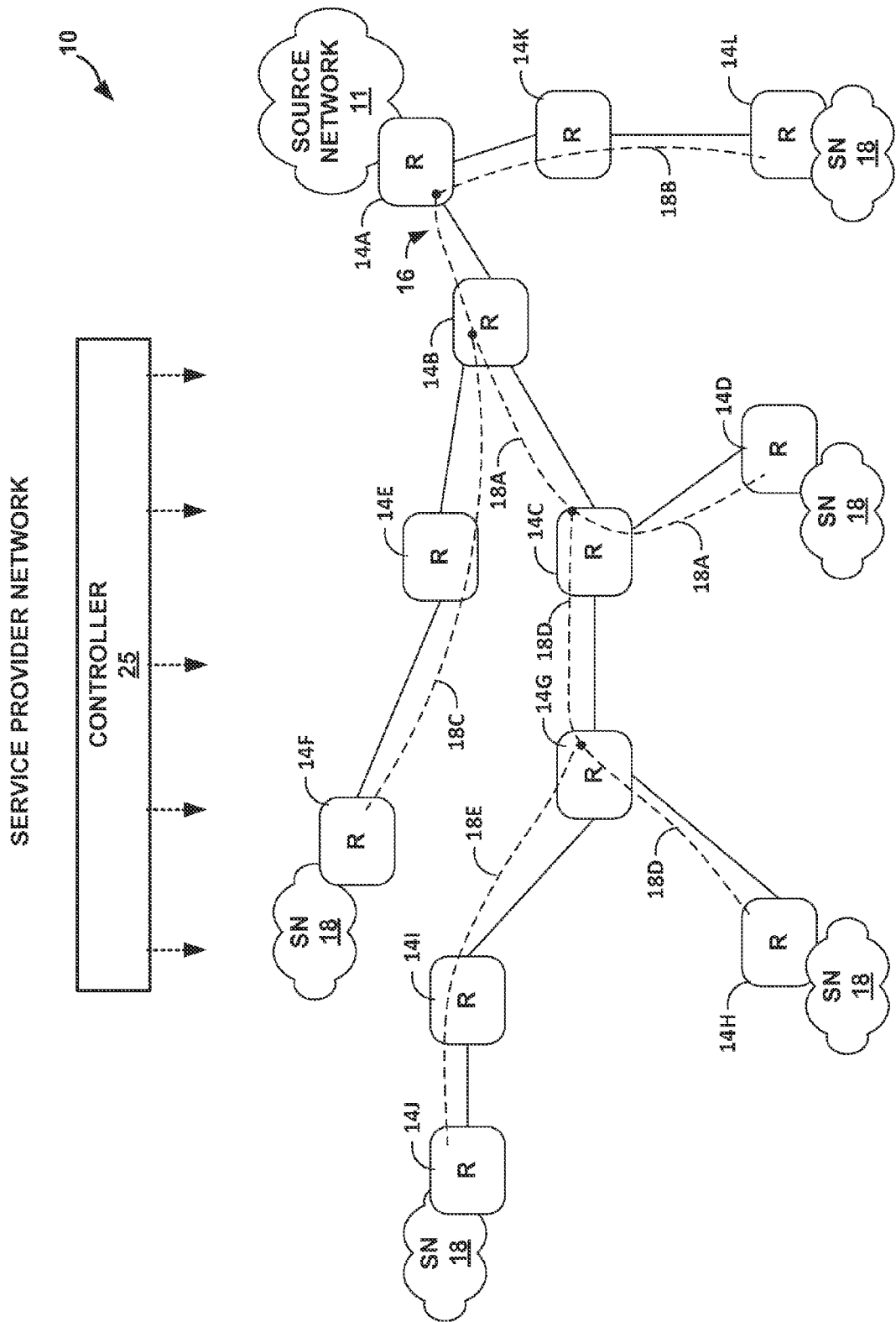
FIG. 1 is a block diagram illustrating an exemplary computer network having a point to multi-point (P2MP) label switch path (LSP).

FIG. 1 is a block diagram illustrating an example network system 10 in accordance with example techniques described herein. As shown in the example of FIG. 1, network system 10 includes a service provider network 12 in which a source provider edge (SPE) router 14A (also referred to as a source network device) uses a Point to Multi-Point (P2MP) label switch path (P2MP LSP) 16 (shown in as dashed lines) to carry traffic between source network 11 and subscriber networks 18.

Source network 11 may comprise any public or private network or the Internet. Subscriber networks 18 may include local area networks (LANs) or wide area networks (WANs) that comprise a plurality of subscriber devices. The subscriber devices may include personal computers, laptops, workstations, personal digital assistants (PDAs), wireless devices, network-ready appliances, filer servers, print servers or other devices that access source network 11 via source router 12A. In some cases, the subscriber devices request multicast streams, such as IPTV channels, from source network 11.

As described herein, routers 14A-14L ("routers 14") establish a P2MP-LSP 16 using a branch node-initiated signaling model in which branch node to leaf (B2L) sub-LSPs are signaled and utilized to form the P2MP LSP. For example, P2MP LSP 16 having a plurality of "levels" may be formed in which the B2L sub-LSPs at each level are "attached" to a sub-LSP at a higher-level branch node or the source node (router 14A). In general, a branch to leaf (B2L) sub-LSP refers to a point-to-point (P2P) LSP that is signaled from a branch node to a leaf node. In the example of FIG. 1, router 14A operates as the source node, routers 14B, 14C, and 14G operate as branch nodes and routers 14F, 14J, 14H, 14D and 14L operate as leaf nodes of P2MP LSP 16.

In one example, controller 25 operates as centralized path computation element to compute paths for all of the S2L and B2L sub-LSPs used to form P2MP LSP 16. Controller 25 may send explicit route objects (EROS) to each of source router 14 and branch routers 14B, 14C, and 14G via a Path Computation Element (PCE) Communication Protocol (PCEP), where each of the EROs specify a particular route from the source router or the brand router to one of the leaf nodes. The source node (router 14A) and the branch nodes (routers 14B, 14C, and 14G) in turn signal the P2P S2L sub-LSPs and B2L sub-LSPs separately along the routes specified by the EROS. In this example, controller 25 may output an ERO directing source router 14A to signal a P2P S2L sub-LSP 18A from source router 14A to leaf router 14D and an ERO directing source router 14A to signal a P2P S2L sub-LSP 18B from source router 14A to leaf router 14L. In addition, controller 25 may output an ERO directing branch router 14B to signal a branch-initiated P2P B2L sub-LSP 18C from branch router 14B to leaf router 14F, an ERO directing branch router 14C to signal a branch-initiated P2P B2L sub-LSP 18D from branch router 14C to leaf router 14H, and an ERO directing branch router 14G to signal a branch-initiated P2P B2L sub-LSP 18E from branch router 14G to leaf router 14J.

After the sub-LSPs are set up, source node 14A internally merges all S2L sub-LSPs (i.e., S2L sub-LSPs 18A, 18B) by constructing a flood next-hop that floods traffic from source network 11 to the S2L sub-LSPs. Separately, each branch node attaches their branch-initiated B2L sub-LSPs to the associated higher level S2L or B2L sub-LSPs that traverse the branch by adding a branch next-hop to the flood next-hop of that higher level sub-LSP.

In this way, routers 14 establish P2MP LSP 16 using a branch node-initiated signaling model in which branch node to leaf (B2L) sub-LSPs are signaled by the branch nodes (routers 14B, 14C and 14G in this example) and utilized to form the P2MP LSP. The techniques may provide certain advantages. For example, the number of sub-LSPs for which each node within P2MP LSP 16 need maintain state is equal to the number of physical data flows output from that node to downstream nodes, i.e., the number of output interfaces used for the P2MP LSP by that node to output data flows to downstream nodes. As such, unlike the conventional source node-initiated model in which the source device maintains state for sub-LSPs for each of the leaf nodes, the size and scalability of a P2MP LSP is no longer bound to the number of leaves that are downstream from that node.

That is, in this example, source node 14A need only maintain control plane state information associated with signaling two P2P sub-LSPs, i.e., P2P S2L sub-LSPs 18A and 18B.

Branch nodes 14B, 14C and 14G maintain control plane state information associated with B2L sub-LSPs 18C, 18D, and 18E, respectively, for which the node operates as an ingress and the higher-level sub-LSP to which the sub-LSP attaches. For example, router 14B need only maintain state for B2L sub-LSP 18C for which the router operates as an ingress and S2L sub-LSP 18A to which sub-LSP 18C attaches. As such, the source node (router 14A) for P2MP LSP 16 need not signal and maintain state for five separate sub-LSP to leaf node (routers 14F, 14J, 14H, 14D and 14L). Similarly, router 14B need not maintain state for B2L sub-LSPs 18D, 18E even though those sub-LSPs service leafs downstream from router 14B. As another example, router 14C need not maintain state for B2L sub-LSP 18E even though the sub-LSP services leaf node (router 14J) downstream from router 14C. Thus, the size and scalability of P2MP LSP 16 is no longer bound to the number of leaves that are downstream from the source node or any given branch node. Hence, the signaling efficiency and scalability of the techniques described herein may be significantly higher than the source node-initiated signaling model. Further, since controller 25 may be able to perform path computation for all sub-LSPs based on a global view of network 10 and provides a centralized coordination between those sub-LSPs, the chance of any remerge condition and cross-over may be significantly reduced.

Figure 2:
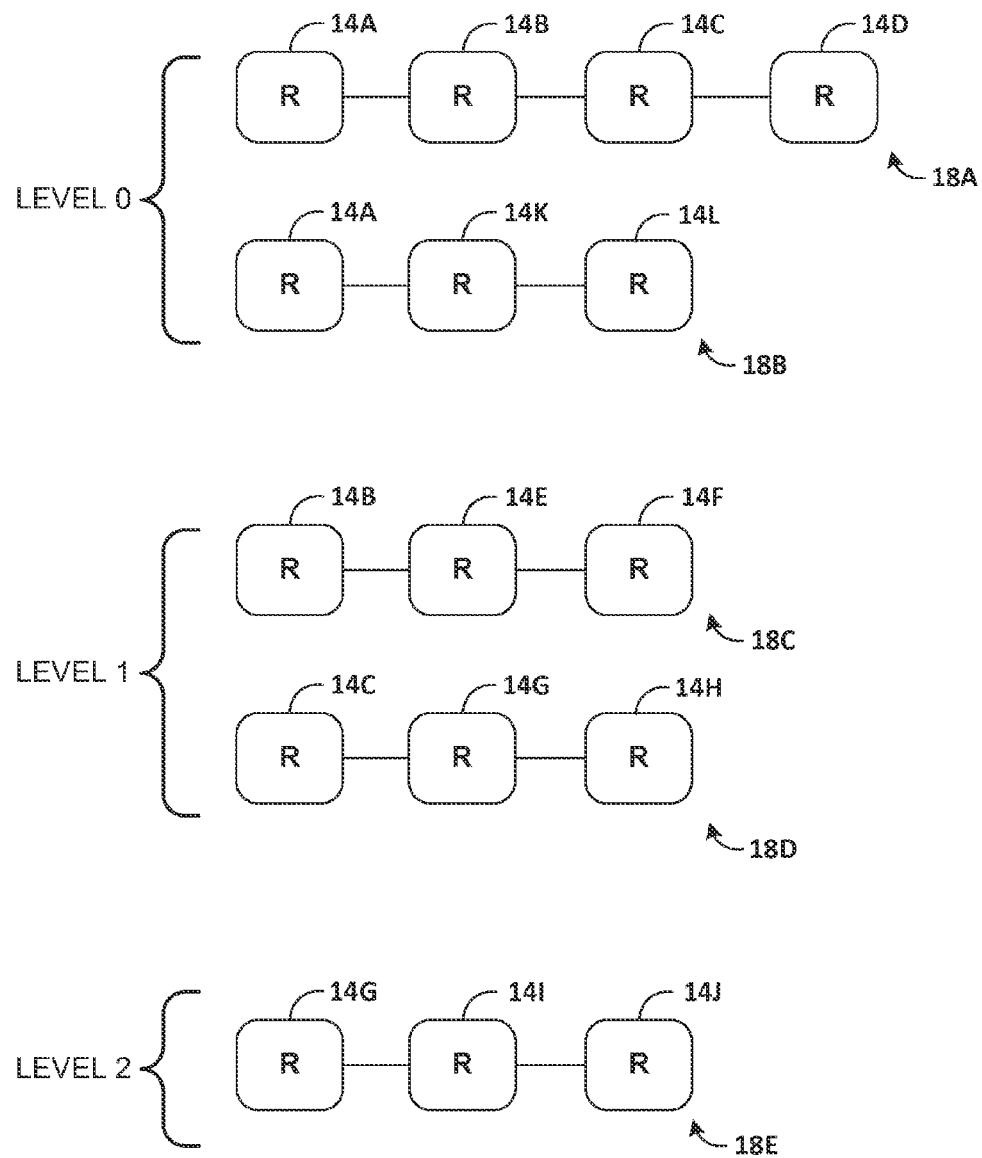
FIG. 2 is a block diagram illustrating the set of P2P sub-LSPs calculated by controller 25 computes for P2MP LSP 16 in the example of FIG. 1.

FIG. 2 is a block diagram illustrating the set of P2P sub-LSPs calculated by controller 25 computes for P2MP LSP 16 in the example of FIG. 1. As shown, controller 25 computes a hierarchy of P2P LSPs having, in this example, three levels: Level 0-Level 2.

In this example, controller 25 computes a first level (Level 0) of S2L P2P sub-LSPs 18A and 18B originating from source node 14A. Controller 25 computes a second level (Level 1) of B2L sub-LSPs 18C and 18D that are to be attached to one of the level 0 sub-LSPs. In the example of FIG. 1, B2L sub-LSP 18C attaches to Level 0 S2L sub-LSP 18A at router 14B. That is, controller 25 determines B2L sub-LSP 18C is to be a sourced by (i.e., ingressed at) router 14B even though router 14B is a branch node of P2MP LSP 16. Similarly, B2L sub-LSP 18D attaches to Level 0 S2L sub-LSP 18A at router 14C, which is a source node for the P2P LSP. Since both sub-LSPs 18C, 18D attach to Level 0 sub-LSPs, both sub-SLPs are viewed as Level 1 B2L sub-LSPs.

To complete P2MP LSP 16, controller 25 computes a third level (Level 2) having a single B2L sub-LSP 18E that attaches to Level 1 sub-LSP 18D. In this way, controller 25 computes N level of P2P sub-LSPs where at any level M, except Level 0, the P2P sub-LSPs are branch-node initiated and attach to a sub-LSP of level M−1. Controller 25 may determine the set B2L LSPs at each level so as to reduce the maximum state to be maintained at any given source or branch node.

Figure 3:
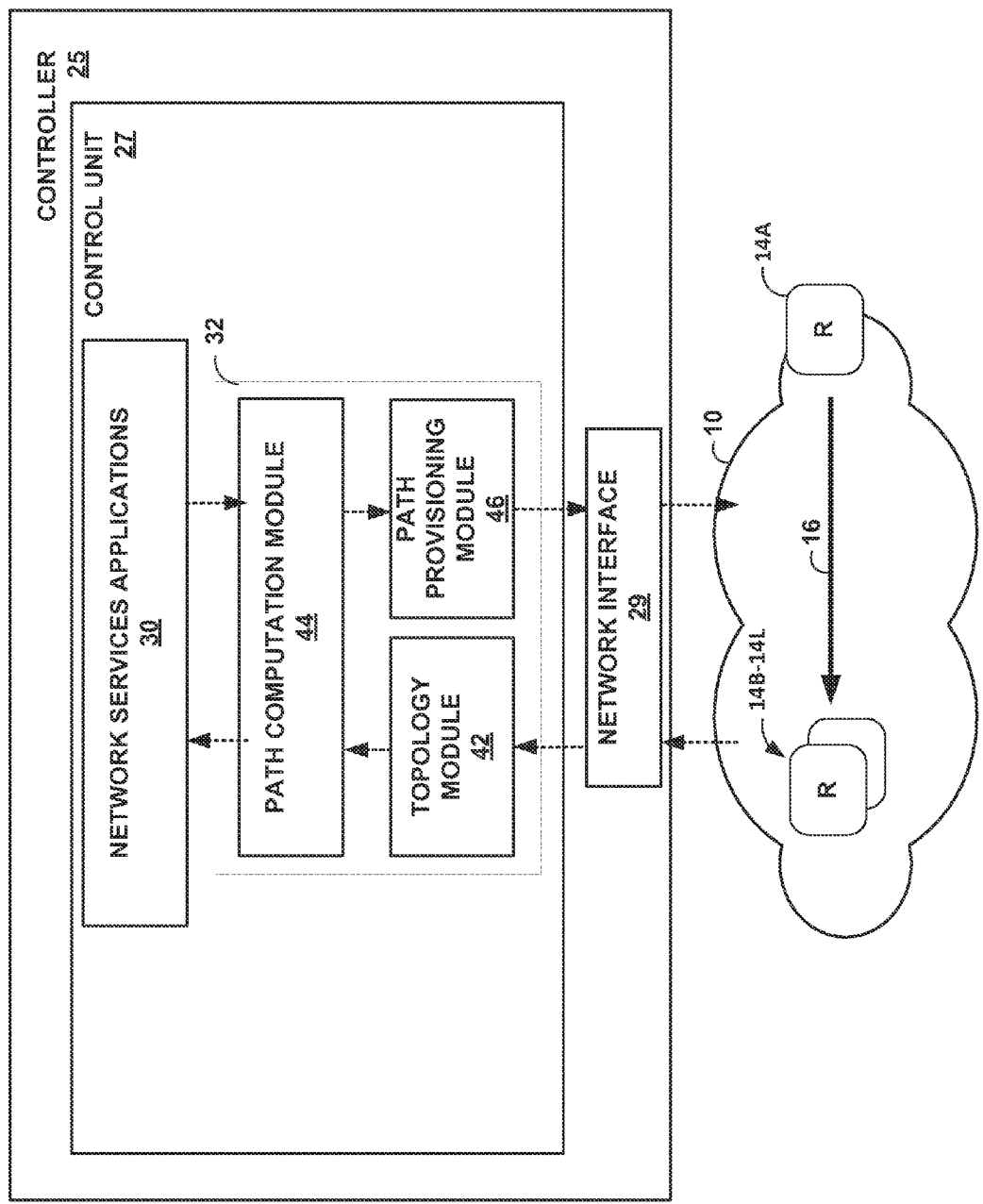
FIG. 3 is a block diagram illustrating an example controller in accordance with this disclosure.

FIG. 3 is a block diagram illustrating an example embodiment of controller 25 of FIG. 1 that, in one example, may be used to establish P2MP-LSP 16 using a branch node-initiated signaling model in which branch node to leaf (B2L) sub-LSPs are signaled and utilized to form the P2MP LSP. Controller 25 may include one or more servers or may be a dedicated appliance.

Controller 25 includes a control unit 27 coupled to a network interface 29 to exchange packets with routers 14 and other network devices of network system 10. Control unit 27 may include one or more processors (not shown in FIG. 3) that execute software instructions, such as those used to define a software or computer program, stored to a computer-readable storage medium, such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 27 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 27 provides an operating environment for network services applications 30, path computation element 32, which includes topology module 42, path computation module 44, and path provisioning module 46. In one example, these modules may be implemented as one or more processes executing on one or more virtual machines of one or more servers. Moreover, while generally illustrated and described as executing on a single controller 25, aspects of these modules may be delegated to other computing devices.

Network services applications 30 represent one or more processes that manage and coordinate services provided to clients or customers of network system 10 Network services applications 30 may provide, for instance, include Voice-over-IP (VoIP), Video-on-Demand (VOD), bulk transport, walled/open garden, IP Mobility Subsystem (IMS) and other mobility services, and Internet services to clients of the service provider network. In response to the needs of the subscriber devices, networks services applications 30 may require services provided by path computation element 32, such as node management, session management, and policy enforcement. Moreover, network services applications 30 may require path computation element 32 to establish transport LSPs, such as P2MP LSP 16, through network system 10 for delivery of the services.

Network services applications 30 issue path requests to path computation element 34 to request transports LSPs (e.g., P2MP LSP 16) in a path computation domain (network system 10) controlled by controller 25. In general, a path request may specify a required bandwidth or other constraint and endpoints representing a source node and one or edge nodes that communicate over the path computation domain managed by controller 25. Path requests may further specify time/date during which paths must be operational and CoS parameters (for instance, bandwidth required per class for certain paths).

Path computation element 34 accepts path requests from network services applications 30 to establish paths between the endpoints over the path computation domain. Paths may be requested for different times and dates and with disparate bandwidth requirements. Path computation element 34 may reconcile path requests from network services applications 30 to multiplex requested paths onto the path computation domain based on requested path parameters and anticipated network resource availability.

To intelligently compute and establish paths through the path computation domain, path computation element 34 may include a topology module 42 to receive and store topology information describing available resources of the path computation domain, including routers 14 and interconnecting communication links.

Path computation module 44 of path computation element 34 computes requested paths through the path computation domain. As explained herein, path computation module 44 may establish P2MP-LSP 16 by computing and directing routers 14 to signal branch node to leaf (B2L) sub-LSPs to form the P2MP LSP. For example, path computation module 44 may compute paths for all of the S2L and B2L sub-LSPs used to form P2MP LSP 16. In response, path provisioning module 46 may send explicit route objects (EROS) to each of source router 14 and branch routers 14B, 14C, and 14G via a Path Computation Element (PCE) Communication Protocol (PCEP), where each of the EROs specify a particular route from the source router or the brand router to one of the leaf nodes. The source node (router 14A) and the branch nodes (routers 14B, 14C, and 14G) in turn signal the P2P S2L sub-LSPs and B2L sub-LSPs separately along the routes specified by the EROS. In this example, path provisioning module 46 may output an ERO directing source router 14A to signal a P2P S2L sub-LSP 18A from source router 14A to leaf router 14D and an ERO directing source router 14A to signal a P2P S2L sub-LSP 18B from source router 14A to leaf router 14L. In addition, path provisioning module 46 may output an ERO directing branch router 14B to signal a branch-initiated P2P B2L sub-LSP 18C from branch router 14B to leaf router 14F, an ERO directing branch router 14C to signal a branch-initiated P2P B2L sub-LSP 18D from branch router 14C to leaf router 14H, and an ERO directing branch router 14G to signal a branch-initiated P2P B2L sub-LSP 18E from branch router 14G to leaf router 14J.

Figure 4:
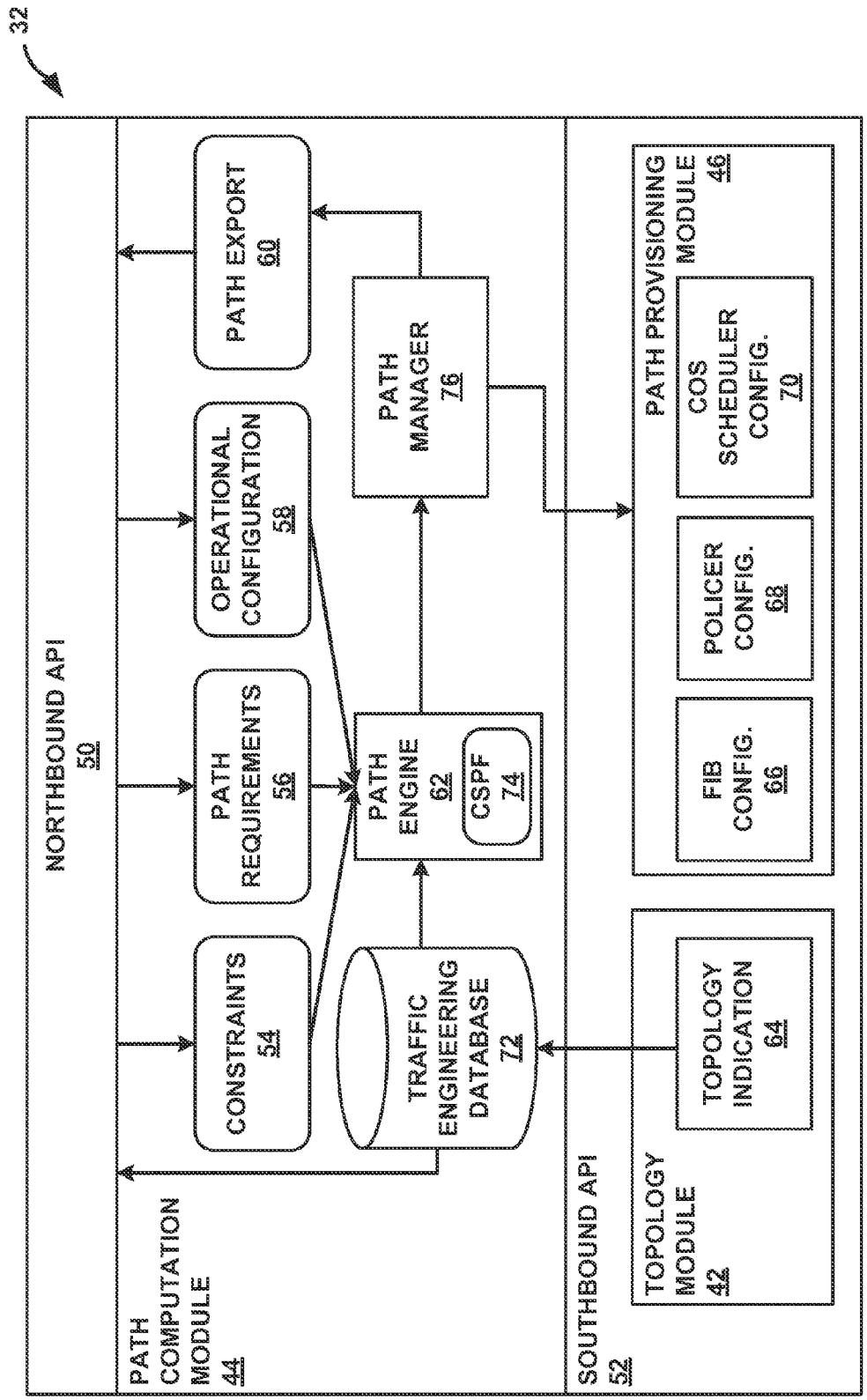
FIG. 4 is a block diagram illustrating, in detail, an example implementation of a path computation element of the centralized controller.

FIG. 4 is a block diagram illustrating, in detail an example implementation of path computation element 32 of controller 25 of FIG. 3. In this example, path computation element 32 includes northbound and southbound interfaces in the form of northbound application programming interface (API) 50 and southbound API (52). Northbound API 50 includes methods and/or accessible data structures by which network services applications 30 may configure and request path computation and query established paths within the path computation domain. Southbound API 52 includes methods and/or accessible data structures by which path computation element 32 receives topology information for the path computation domain and establishes paths by accessing and programming data planes of aggregation nodes and/or access nodes within the path computation domain.

Path computation module 44 includes data structures to store path information for computing and establishing requested paths. These data structures include constraints 54, path requirements 56, operational configuration 58, and path export 60. Network services applications 30 may invoke northbound API 50 to install/query data from these data structures. Constraints 54 represent a data structure that describes external constraints upon path computation. Constraints 54 allow network services applications 30 to, e.g., modify link attributes before path computation module 44 computes a set of paths. For examples, Radio Frequency (RF) modules (not shown) may edit links to indicate that resources are shared between a group and resources must be allocated accordingly. Network services applications 30 may modify attributes of link to effect resulting traffic engineering computations in accordance with CCP. In such instances, link attributes may override attributes received from topology indication module 64 and remain in effect for the duration of the node/attendant port in the topology. A link edit message to constraints 54 may include a link descriptor specifying a node identifier and port index, together with link attributes specifying a bandwidth, expected time to transmit, shared link group, and fate shared group, for instance. The link edit message may be sent by the PCE.

Operational configuration 58 represents a data structure that provides configuration information to path computation element 32 to configure the path computation algorithm with respect to, for example, class of service (CoS) descriptors and detour behaviors. Operational configuration 58 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain.

Path export 60 represents an interface that stores path descriptors for all paths currently committed or established in the path computation domain. In response to queries received via northbound API 50, path export 60 returns one or more path descriptors. Queries received may request paths between any two edge and access nodes terminating the path(s). Path descriptors may be used by network services applications 30 to set up forwarding configuration at the edge and access nodes terminating the path(s). A path descriptor may include an Explicit Route Object (ERO). A path descriptor or "path information" may be sent, responsive to a query from an interested party, in accordance with CCP. A path export message delivers path information including path type (primary or detour); bandwidth for each CoS value; and, for each node in the ordered path from ingress to egress, a node identifier, ingress label, and egress label.

Path requirements 56 represent an interface that receives path requests for paths to be computed by path computation module 44 and provides these path requests (including path requirements) to path engine 62 for computation. Path requirements 56 may be received in accordance with CCP, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 42 includes topology indication module 64 to handle topology discovery and, where needed, to maintain control channels between path computation element 32 and nodes of the path computation domain. Topology indication module 64 may include an interface to describe received topologies to path computation module 44.

Topology indication module 64 may use CCP topology discovery or some other topology discovery protocol to describe the path computation domain topology to path computation module 44. Using CCP topology discovery, topology indication module 64 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 64 may communicate with a topology server, such as a routing protocol route reflector, to receive topology information for a network layer of the network. Topology indication module 64 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 64 may in some instances be a passive listener that neither forwards nor originates routing protocol advertisements. In some instances, topology indication module 64 may alternatively, or additionally, execute a topology discovery mechanism such as an interface for an Application-Layer Traffic Optimization (ALTO) service. Topology indication module 64 may therefore receive a digest of topology information collected by a topology server, e.g., an ALTO server, rather than executing a routing protocol to receive routing protocol advertisements directly.

In some examples, topology indication module 64 receives topology information that includes traffic engineering (TE) information. Topology indication module 64 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 64 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 72 stores topology information, received by topology indication module 64, for a network that constitutes a path computation domain for controller 25 to a computer-readable storage medium (not shown). TED 72 may include one or more link-state databases (LSDBs), where link and node data is received in routing protocol advertisements, received from a topology server, and/or discovered by link-layer entities such as an overlay controller and then provided to topology indication module 64. In some instances, an operator may configure traffic engineering or other topology information within TED 72 via a client interface.

Path engine 62 accepts the current topology snapshot of the path computation domain in the form of TED 72 and computes, using TED 72, CoS-aware traffic-engineered paths between nodes as indicated by configured node-specific policy (constraints 54) and/or through dynamic networking with external modules via APIs. Path engine 62 may further compute detours for all primary paths on a per-CoS basis according to configured failover and capacity requirements (as specified in operational configuration 58 and path requirements 56, respectively).

In general, to compute a requested path, path engine 62 determines based on TED 72 and all specified constraints whether there exists a path in the layer that satisfies the TE specifications for the requested path for the duration of the requested time. Path engine 62 may use the Djikstra constrained SPF (CSPF) 246 path computation algorithms for identifying satisfactory paths though the path computation domain. If there are no TE constraints, path engine 62 may revert to SPF. If a satisfactory computed path for the requested path exists, path engine 62 provides a path descriptor for the computed path to path manager 76 to establish the path using path provisioning module 46. A path computed by path engine 62 may be referred to as a "computed" path, until such time as path provisioning module 46 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 76 establishes computed scheduled paths using path provisioning module 46, which in this instance includes forwarding information base (FIB) configuration module 66 (illustrated as "FIB CONFIG. 66"), policer configuration module 68 (illustrated as "POLICER CONFIG. 68"), and CoS scheduler configuration module 70 (illustrated as "COS SCHEDULER CONFIG. 70").

FIB configuration module 66 may program forwarding information to data planes of nodes of the path computation domain, e.g., network system 10. For example, in the event controller 25 allocates MPLS labels for the entire P2MP LSP 16, FIB configuration module 66 of path provisioning module 46 may construct and install a flooding next hop at each of the branch nodes to forward traffic from a higher level one of the P2P S2L sub-LSPs or P2P B2L sub-LSPs to one of the P2P B2L sub-LSPs for which the branch node operates as an ingress. Alternatively, the flooding next hop may be constructed locally at each of the branch nodes during the signaling of P2MP LSP 16. As a result, the forwarding information (FIB) of a node within network system 10 may include the MPLS switching tables including the necessary flooding next hop(s), a detour path for each primary LSP, a CoS scheduler per-interface and policers at LSP ingress.

FIB configuration module 66 may implement, for instance, a PCEP protocol or a software-defined networking (SDN) protocol, such as the OpenFlow protocol, to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 66 may in addition, or alternatively, implement other interface types, such as a Simple Network Management Protocol (SNMP) interface, path computation element protocol (PCEP) interface, a Device Management Interface (DMI), a CLI, Interface to the Routing System (IRS), or any other node configuration interface. FIB configuration module 66 may establish communication sessions with nodes to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding IRS are found in "Interface to the Routing System Framework," Network Working Group, Internet-draft, Jul. 30, 21012, which is incorporated by reference as if fully set forth herein.

FIB configuration module 66 may add, change (i.e., implicit add), or delete forwarding table entries in accordance with information received from path computation module 44. A FIB configuration message from path computation module 44 to FIB configuration module 66 may specify an event type (add or delete); a node identifier; a path identifier; one or more forwarding table entries each including an ingress port index, ingress label, egress port index, and egress label; and a detour path specifying a path identifier and CoS mode.

Policer configuration module 68 may be invoked by path computation module 44 to request a policer be installed on a particular aggregation node or access node for a particular LSP ingress. As noted above, the FIBs for aggregation nodes or access nodes include policers at LSP ingress. Policer configuration module 68 may receive policer configuration requests according to CCP. A CCP policer configuration request message may specify an event type (add, change, or delete); a node identifier; an LSP identifier; and, for each class of service, a list of policer information including CoS value, maximum bandwidth, burst, and drop/remark. FIB configuration module 66 configures the policers in accordance with the policer configuration requests.

CoS scheduler configuration module 70 may be invoked by path computation module 44 to request configuration of CoS scheduler on the aggregation nodes or access nodes. CoS scheduler configuration module 70 may receive the CoS scheduler configuration information in accordance with CCP. A CCP scheduling configuration request message may specify an event type (change); a node identifier; a port identity value (port index); and configuration information specifying bandwidth, queue depth, and scheduling discipline, for instance.

Figure 5:
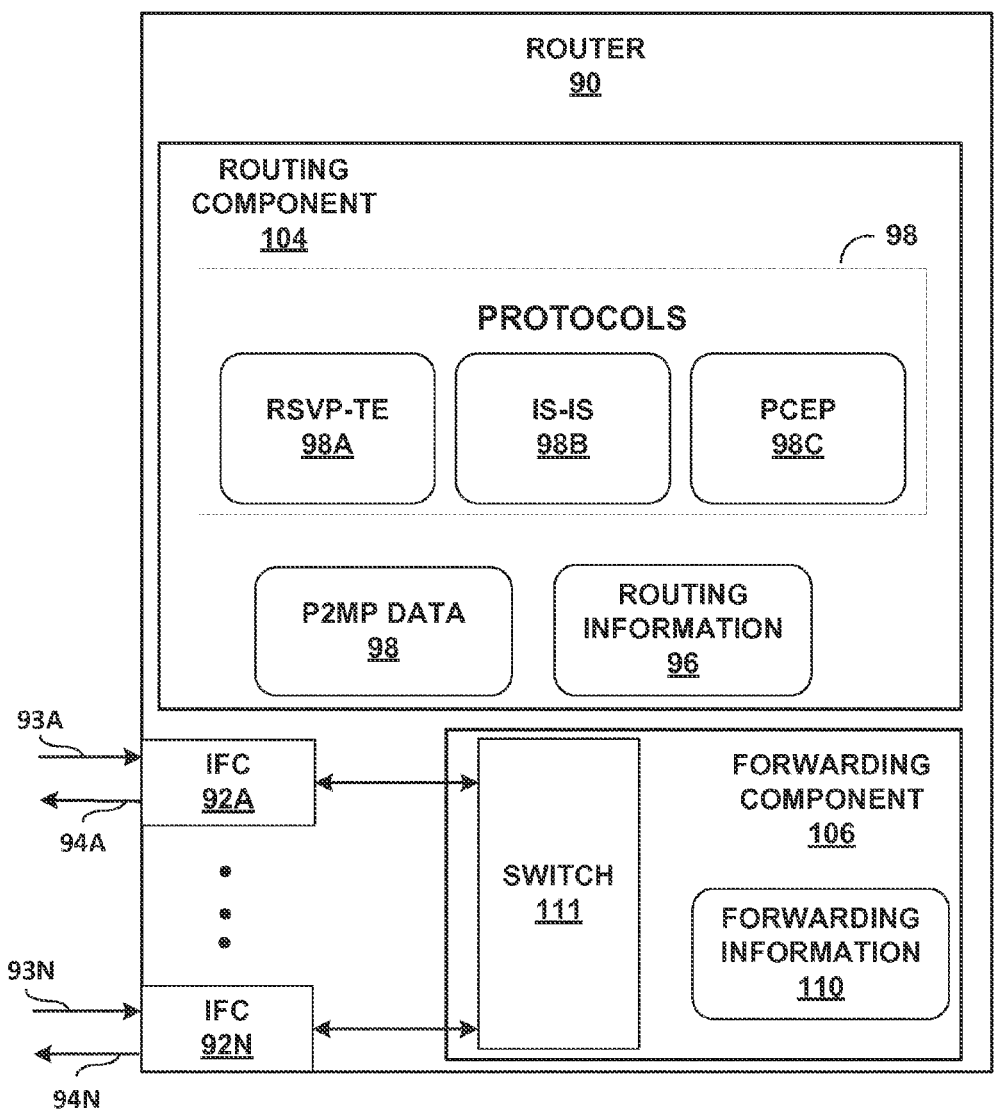
FIG. 5 is a block diagram illustrating an example router configured to establish P2MP LSPs in accordance with the techniques described herein.

FIG. 5 is a block diagram illustrating an example router 90 configured to establish P2MP LSPs in accordance with the techniques described herein. Router 90 may correspond to any of routers 14 of FIG. 1.

In the example of FIG. 5, router 90 includes routing component 104 and forwarding component 106. Routing component 104 provides control plane functionality for router 90 while forwarding component switches packets between input links 93 and output links 94.

Router 90 includes interface cards 92A-92N ("IFCs 92") for receiving packets via input links 93A-93N ("input links 93") and sending packets via output links 94A-94N ("output links 94"). IFCs 92 are interconnected by a high-speed switch 111 provided by forwarding component 106. In one example, the switch comprises switch fabric, switchgear, a configurable network switch or hub, and the like. Links 93, 94 comprise any form of communication path, such as electrical paths within an integrated circuit, external data busses, optical links, network connections, wireless connections, or other type of communication path. IFCs 92 are coupled to input links 93 and output links 94 via a number of interface ports (not shown).

Routing component 104 provides an operating environment for protocols 98, which are typically implemented as executable software instructions. As illustrated, protocols 98 include RSVP-TE 98A, intermediate system to intermediate system (IS-IS) 98B and PCEP 98C.

By executing the routing protocols, routing component 104 may identify existing routes through the network and determines new routes through the network. Routing component 104 stores routing information in a routing information base (RIB) 96 that includes, for example, known routes through the network. Forwarding component 106 stores forwarding information base (FIB) 110 that includes destinations of output links 94. FIB 110 may be generated in accordance with RIB 96.

As described herein, router 90 may receive commands from a centralized controller, such as controller 25, via PCEP 98C. In response, router 90 invokes RSVP-TE 98A to signal P2P sub-LSPs for merging into a P2MP LSP. Protocols 98 may include other routing protocols in addition to or instead of RSVP-TE 98A, IS-IS 98B and PCEP 98C, such as other Multi-protocol Label Switching (MPLS) protocols including LDP, or routing protocols, such as Internet Protocol (IP), the open shortest path first (OSPF), routing information protocol (RIP), border gateway protocol (BGP), interior routing protocols, or other network protocols.

The architecture of router 90 illustrated in FIG. 5 is shown for exemplary purposes only. This disclosure is not limited to this architecture. In other embodiments, router 90 may be configured in a variety of ways. In one embodiment, for example, some of the functionally of control unit 92 may be distributed within IFCs 92.

Routing component 104 and forwarding component 106 may be implemented solely in software, or hardware, or may be implemented as a combination of software, hardware, or firmware. For example, routing component 104 and forwarding component 106 may include one or more processors which execute program code in the form of software instructions. In that case, the various software modules of router 90 may comprise executable instructions stored on a computer-readable storage medium, such as computer memory or hard disk.

Figure 6:
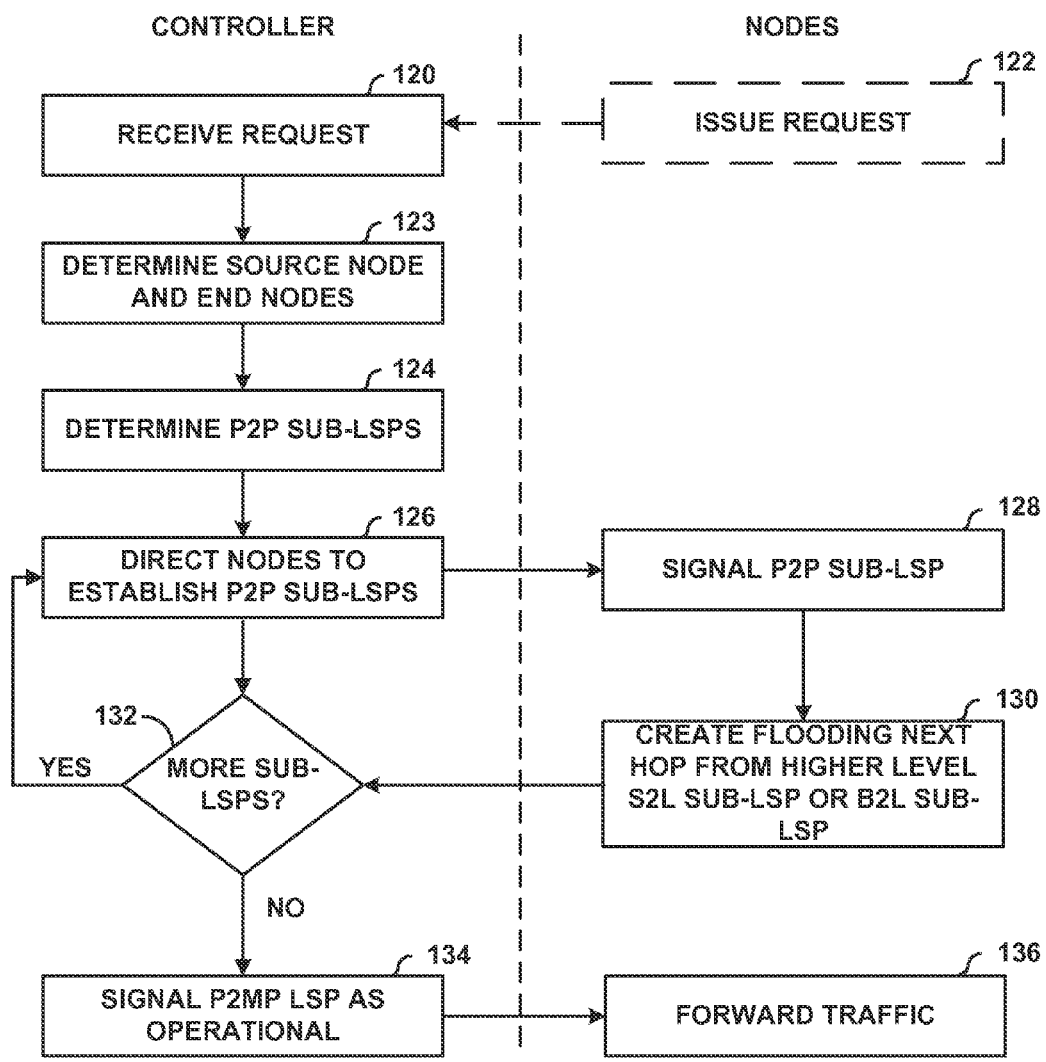
FIG. 6 is a flowchart illustrating an exemplary operation of a network system that establishes a P2MP-LSP using a branch node-initiated signaling model as described herein.

FIG. 6 is a flowchart illustrating an exemplary operation of a network system that establishes a P2MP-LSP using a branch node-initiated signaling model as described herein. For purpose of example, the flowchart of FIG. 6 will be explained in reference to the example network system 10 of FIG. 1.

Initially, controller 25 receives a request or other message indicative of a need for a P2MP LSP (120). For example, controller 25 may receive a request from one or more nodes within network system 10 for a service (122), such as a request to join a L2 or L3 VPN or to join a particular multicast group. As another example, controller 25 may receive a request in the form of configuration data from an administrator specifying a service or a specific P2MP LSP that is required.

In response and based upon the particular, controller 25 may determine a source node associated with a source of the service (e.g., source network 11) and one or more end nodes associated with destinations of the service (e.g., one subscriber networks 18) (123). In the example described above, controller 25 may identify router 14A as a source node for a requested service and routers 14D, 14F, 14H, 14J and 14L as leaf nodes for delivering the service to subscribers of subscriber networks 18.

Upon determining the source node and the one or more end nodes, controller 25 computes a set of P2P sub-LSPs that may be used to form a P2MP LSP from the source node to the end node (124). Moreover, rather than identify a set of P2P LSPs that all originate from the source node, controller 25 identifies the set of P2P LSPs to include one or more P2P LSPs that originate from a branch node of the P2MP LSP and, therefore, are to be signaled by the branch node. Further, controller 25 may determine the set of branch-node initiated P2P LSPs to be used so as to reduce or minimize the state maintained at any given node of the P2MP LSP. In the example above, controller 25 determines the P2P sub-LSPs 18A-18E where the source node (router 14A) need only maintain state for two sub-LSPs (18A and 18B). As sub-LSPs 18C-18E will be branch-initiated LSPs, the source node for the P2MP LSP need not maintain state for the LSPs. Moreover, the number of sub-LSPs for which the source node and given branch node need maintain state will be equal the number of physical data flows output from that node to downstream nodes, i.e, the number of output interfaces used for the P2MP LSP to output data flows from that node to downstream nodes.

For example, source router 14A need only maintain state for sub-LSPs 18A and 18B. Moreover, branch router 14B need only maintain state for two sub-LSPs: (1) branch P2P sub-LSP 18C that router 14B initiated, and (2) P2P sub-LSP 18A to which the branch LSP 18C will be stitched. As another example, branch router 14G need only maintain state for two sub-LSPs: (1) branch P2P sub-LSP 18E that router 14G initiated and for which the router operates as the ingress, and (2) P2P sub-LSP 18D to which the branch LSP 18E will be attached. In this way, the source node and each branch node need only maintain state for a number of sub-LSPs that is equal to the number of physical output interfaces at that node that are used to carry traffic for the P2MP LSP. As such, the signaling efficiency and scalability for each of the nodes may be significantly improved.

Upon determining the P2P sub-LSPs, controller 25 directs the appropriate nodes of network system 10 to initiate signaling and establishment of the P2P sub-LSPs (126, 132). For example, controller 25 may output EROs to routers 14A, 14B, 14C and 14G to signal P2P sub-LSPs 18 since these routers operate as ingresses to the sub-LSPs, as shown in FIG. 2. Controller 25 may include within the instructions an identifier for the P2MP LSP for which the P2P LSPs are to be used. Upon receiving the direction from controller 25, the ingress nodes for the sub-LSPs (routers 14A, 14B, 14C and 14G) signal P2P sub-LSPs 18A (128). For example, upon receiving direction from controller 25 via PCEP 98C, a routing component 104 within each of these routers may invoke RSVP-TE 98A to establish the requested P2P LSP in accordance with the RSVP protocol.

Further, routers 14A, 14B, 14C and 14G stich the P2P sub-LSPs to form the desired P2MP LSP (130). For example, router 14A may initiate signaling of P2P sub-LSP 18A with routers 14B, 14C and 14D. In addition, router 14B may initiate signaling of P2P sub-LSP 18C with routers 14E and 14F. At this time, router 14B determines that P2P sub-LSPs 18A and 18C share a common identifier for a P2MP LSP 16, in this example. As such, router 14B stitches level 1 P2P sub-LSP 18C to level 0 P2P sub-LSP 18A. For example, RSVP-TE 98A of router 14B may build a flood next hop within forwarding information 110 of forwarding component 106 so incoming traffic associated with P2P sub-LSP 18A is flooded output interfaces associated with downstream routers 14C and 14E. At this time, RSVP-TE 98A may construct the flood next hop as a chained next hop that directs forwarding component 106 to perform different label operations for each output interface. For purposes of example, routing component 104 of router 14B may construct the flood next hop as 100 {200, 300}, which indicates that inbound traffic received from router 14A with label 100 (as allocated to router 14A by router 14B for P2P sub-LSP 18A) is to be swapped and output with label 200 on an output interface associated with router 14C and output with label 300 on an output interface associated with router 14E, where label 200 was signaled by router 14C for sub-LSP 18A and label 300 was signaled by router 14E for sub-LSP 18C. Further examples of construction of a chained next hop are described in U.S. Pat. No. 7,990,993, entitled "PLATFORM-INDEPENDENT CONTROL PLANE AND LOWER-LEVEL DERIVATION OF FORWARDING STRUCTURES," incorporated herein by reference.

Controller 25 continues to direct routers 14 to establish the P2P sub-LSPs (126), which the routers establish and stitch (128,130), until the entire P2MP forwarding tree is established and P2MP LSP is operational (134). Upon establishing the P2MP LSP, routers 14 operate to forward traffic from the source node (router 14A) to the leaf nodes (14D, 14F, 14H, 14J and 14L) via the P2MP LSP.

Various embodiments of the invention have been described. These and other embodiments are within the scope of the following claims.

The invention claimed is:

1. A method comprising:
   receiving, with a controller, a request for a point-to-multipoint (P2MP) label switched path (LSP) from a source node through one or more branch nodes to a plurality of leaf nodes within a network;
   determining, with the controller, a hierarchy of point-to-point (P2P) sub-LSPs, wherein a first level of the hierarchy includes at least one P2P source-to-leaf (S2L) sub-LSP from the source node as an ingress for the P2P S2L sub-LSP through one or more of the branch nodes to a first one of the leaf nodes as an egress for the P2P S2L LSP, and wherein each remaining level of the hierarchy includes at least one P2P branch-to-leaf (B2L) sub-LSP from one of the branch nodes as in ingress to the P2P B2L sub-LSP to a different one of the leaf nodes as an egress for the P2P B2L sub-LSP; and
   outputting messages, with the controller, to direct the source node, the one or more branch nodes and the plurality of leaf nodes to signal the hierarchy of P2P sub-LSPs to form the P2MP LSP.

2. The method of claim 1, wherein determining a hierarchy of P2P sub-LSPs including selecting each of the P2P sub-LSPs so that, for each of the source node and the branch nodes, the number of P2P sub-LSPs flowing through the node for the P2MP LSP is equal to the number of output interfaces from that node to downstream nodes used for the P2MP LSP.

3. The method of claim 1, further comprising, at each of the branch nodes, installing a flooding next hop to forward traffic from a higher level one of the P2P S2L sub-LSPs or P2P B2L sub-LSPs to one of the P2P B2L sub-LSPs for which the branch node operates as an ingress.

4. The method of claim 1, wherein outputting messages comprises outputting, from the controller, messages in accordance with a Path Computation Element (PCE) Communication Protocol (PCEP), wherein the messages include explicit route objects (EROS) specifying the P2P S2L sub-LSP and the P2P B2L sub-LSPs.

5. The method of claim 1, wherein outputting messages comprises outputting, from the controller, messages in accordance with a software-defined networking (SDN) protocol.

6. The method of claim 1, wherein the controller comprises a centralized controller within the network.

7. The method of claim 1, wherein receiving a request for a P2MP LSP comprises receiving a request for a network service to be delivered from a source to a plurality of subscribers.

8. The method of claim 1, wherein receiving a request for a P2MP LSP comprises receiving configuration data from an administrator specifying the P2MP LSP.

9. A device comprising:
   a network interface to receive a request for a point-to-multipoint (P2MP) label switched path (LSP) from a source node through one or more branch nodes to a plurality of leaf nodes within a network;
   a path computation module executing on one or more processors, wherein the path computation module determines a hierarchy of point-to-point (P2P) sub-LSPs, wherein a first level of the hierarchy includes at least one P2P source-to-leaf (S2L) sub-LSP from the source node as an ingress for the P2P S2L sub-LSP through one or more of the branch nodes to a first one of the leaf nodes as an egress for the P2P S2L LSP, and wherein each remaining level of the hierarchy includes at least one P2P branch-to-leaf (B2L) sub-LSP from one of the branch nodes as in ingress to the P2P B2L sub-LSP to a different one of the leaf nodes as an egress for the P2P B2L sub-LSP; and
   a path provisioning module to output messages to direct the source node, the one or more branch nodes and the plurality of leaf nodes to signal the hierarchy of P2P sub-LSPs to form the P2MP LSP.

10. The device of claim 9, wherein the path computation module selects each of the P2P sub-LSPs so that, for each of the source node and the branch nodes, the number of P2P sub-LSPs flowing through the node for the P2MP LSP is equal to the number of output interfaces from that node to downstream nodes used for the P2MP LSP.

11. The device of claim 9, wherein the path provisioning module outputs messages to install a flooding next hop at each of the branch nodes to forward traffic from a higher level one of the P2P S2L sub-LSPs or P2P B2L sub-LSPs to one of the P2P B2L sub-LSPs for which the branch node operates as an ingress.

12. The device of claim 9, wherein the path provisioning module outputs messages in accordance with a Path Computation Element (PCE) Communication Protocol (PCEP), wherein the messages include explicit route objects (EROS) specifying the P2P S2L sub-LSP and the P2P B2L sub-LSPs.

13. The device of claim 9, wherein the path provisioning module outputs messages in accordance with a software-defined networking (SDN) protocol.

14. The device of claim 9, wherein the device comprises a software-defined network controller.

15. The device of claim 9, further comprising a network services application to receive, via the network interface, the request for a network service to be delivered from a source to a plurality of subscribers.

16. The device of claim 9, wherein the request for the P2MP LSP comprises configuration data received from an administrator specifying the P2MP LSP.

17. A computer-readable storage medium comprising instructions that cause a network device to:
  receive a request for a point-to-multipoint (P2MP) label switched path (LSP) from a source node through one or more branch nodes to a plurality of leaf nodes within a network;
  determine a hierarchy of point-to-point (P2P) sub-LSPs, wherein a first level of the hierarchy includes at least one P2P source-to-leaf (S2L) sub-LSP from the source node as an ingress for the P2P S2L sub-LSP through one or more of the branch nodes to a first one of the leaf nodes as an egress for the P2P S2L LSP, and wherein each remaining level of the hierarchy includes at least one P2P branch-to-leaf (B2L) sub-LSP from one of the branch nodes as in ingress to the P2P B2L sub-LSP to a different one of the leaf nodes as an egress for the P2P B2L sub-LSP; and
  output messages, with the controller, to direct the source node, the one or more branch nodes and the plurality of leaf nodes to signal the hierarchy of P2P sub-LSPs to form the P2MP LSP.

18. The computer-readable storage medium of claim 17, wherein the instructions cause the processor to select each of the P2P sub-LSPs so that, for each of the source node and the branch nodes, the number of P2P sub-LSPs flowing through the node for the P2MP LSP is equal to the number of output interfaces from that node to downstream nodes used for the P2MP LSP.

19. The computer-readable storage medium of claim 17, wherein the instructions cause the processor to output the messages in accordance with a Path Computation Element (PCE) Communication Protocol (PCEP), wherein the messages include explicit route objects (EROS) specifying the P2P S2L sub-LSP and the P2P B2L sub-LSPs.

20. The computer-readable storage medium of claim 17, wherein the instructions cause the processor to output the messages in accordance a software-defined networking (SDN) protocol.

* * * * *